United States Patent
Kenig et al.

(10) Patent No.: US 9,582,578 B2
(45) Date of Patent: *Feb. 28, 2017

(54) INCREMENTAL CRAWLING OF MULTIPLE CONTENT PROVIDERS USING AGGREGATION

(71) Applicant: International Business Machines Corporation, Armonk, NY (US)

(72) Inventors: Batya Kenig, Haifa (IL); Constantin Radchenko, Nesher (IL); Eitan Shapiro, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,804

(22) Filed: Jun. 30, 2014

(65) Prior Publication Data

US 2014/0317083 A1    Oct. 23, 2014

Related U.S. Application Data

(63) Continuation of application No. 12/343,009, filed on Dec. 23, 2008, now Pat. No. 8,799,261.

(Continued)

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
CPC ......... G06F 17/30864; G06F 17/30572; G06F 17/30861

(Continued)

(56) References Cited

U.S. PATENT DOCUMENTS 5,933,832 A    8/1999   Suzuoka et al.
6,631,369 B1   10/2003  Meyerzon et al.
(Continued)

FOREIGN PATENT DOCUMENTS

EP    1100023       4/2002
JP    1091638 A     4/1998
(Continued)

OTHER PUBLICATIONS

Makoto Nakatsuji et al., "A Proposal of Topic-Driven Resource Discovery System over Peer to Peer Network" IPSJ SIG Notes, Information Processing Society of Japan, vol. 2001, No. 41, May 17, 2001, pp. 47-54.
(Continued)

*Primary Examiner* — MD. I Uddin
(74) *Attorney, Agent, or Firm* — Joe Polimeni; Edell, Shapiro & Finnan, LLC

(57) ABSTRACT

A method for incremental crawling of content stored on a plurality of content providers using aggregation is provided. The method comprises receiving a request to crawl content on one or more associated content providers; retrieving one or more first references to content on a first content provider; retrieving one or more second references to content on one or more second content providers during the same request; aggregating the first and second references; and returning the aggregated first and second references. This is done while taking into consideration opaque timestamp object which is managed in a distributed manner. The opaque timestamp is filled in by the content providers but stored in the crawler side between crawling sessions.

20 Claims, 12 Drawing Sheets

Related U.S. Application Data

(60) Provisional application No. 61/058,934, filed on Jun. 5, 2008.

(58) Field of Classification Search
USPC .................. 707/709, 710, 711, 736, 741
See application file for complete search history.

(56) References Cited

U.S. PATENT DOCUMENTS

| | | | |
|---|---|---|---|
| 6,633,873 | B1 | 10/2003 | Nakamura |
| 6,638,314 | B1 | 10/2003 | Meyerzon et al. |
| 7,185,019 | B2 | 2/2007 | Nayak |
| 7,328,401 | B2 | 2/2008 | Obata et al. |
| 7,509,315 | B1 | 3/2009 | Alpert et al. |
| 7,676,553 | B1 | 3/2010 | Laucius et al. |
| 8,595,718 | B1 * | 11/2013 | Naslavsky ........ G06F 17/30572 707/710 |
| 2004/0064442 | A1 | 4/2004 | Popovitch |
| 2005/0234895 | A1 * | 10/2005 | Kramer ............. G06F 17/30864 |
| 2006/0004691 | A1 | 1/2006 | Sifry |
| 2008/0172377 | A1 * | 7/2008 | Kapadia ............ G06F 17/30867 |
| 2009/0319481 | A1 | 12/2009 | Chitrapura et al. |

FOREIGN PATENT DOCUMENTS

| | | |
|---|---|---|
| JP | 2000235583 A | 8/2000 |
| JP | 2001014210 A | 1/2001 |
| JP | 2001202283 A | 7/2001 |
| WO | 0186507 | 11/2001 |

OTHER PUBLICATIONS

Dong, S., et al., "A Parallel Crawling Schema Using Dynamic Partition," Computational Science—ICCS 2004 (Lecture Notes in Computer Science LNCS), Springer-Verlag, vol. 3036, May 13, 2004, pp. 287-294.

* cited by examiner

INCREMENTAL CRAWLING OF MULTIPLE CONTENT PROVIDERS USING AGGREGATION

CROSS-REFERENCE TO RELATED APPLICATIONS

This application is a Continuation of U.S. patent application Ser. No. 12/343,009, entitled "Incremental Crawling of Multiple Content Providers Using Aggregation," and filed on Dec. 23, 2008, which claims the benefit of earlier filing date and right of Provisional Application No. 61/058,934, filed on Jun. 5, 2008, entitled "Incremental Crawling of Multiple Content Providers Using Aggregation", the contents of which are hereby incorporated by reference herein in their entireties.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to search engines and, more particularly, to a system and method for incremental crawling of multiple content providers using aggregation.

BACKGROUND

Content such as text, pictures, audio, video or other data formats can be stored on multiple storage systems connected to a communication network (e.g., the Internet). Such content is typically logically represented as one or more electronic files. A search engine may be used to identify files that satisfy a certain search query submitted for accessing certain content. For a search engine to operate efficiently, the content needs to be indexed in advance. A software mechanism (e.g., a crawler) can be used to crawl the different files or sites on the network for content. The term crawling refers to the process of collecting content of multiple files for indexing so that the content can be searched.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for incremental crawling of content stored on a plurality of content providers using aggregation is provided. The method comprises receiving a request to crawl content on one or more associated content providers; retrieving one or more first references to content on a first content provider; retrieving one or more second references to content on one or more second content providers during the same request; aggregating the first and second references; and returning the aggregated first and second references.

In accordance with another embodiment, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
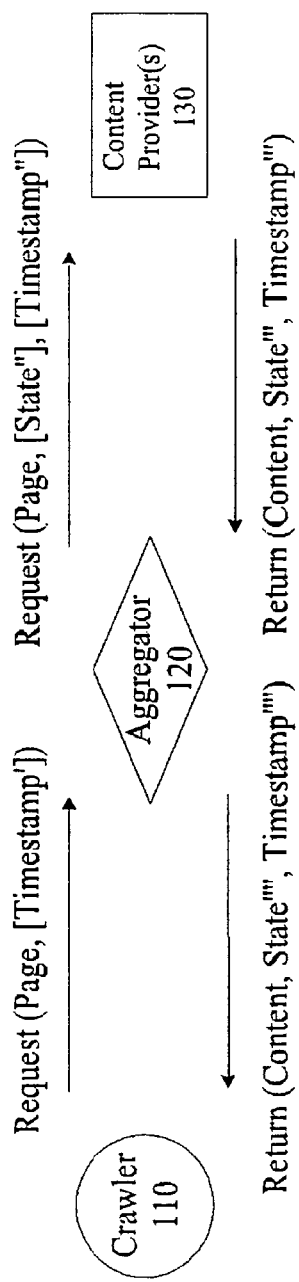
FIG. 1 is a high-level block diagram of an exemplary operating environment, in accordance with one or more embodiments.

Referring to FIG. 1, in accordance with one embodiment, an exemplary operating environment may comprise crawler 110, aggregator 120, and one or more content providers 130. Crawler 110 and aggregator 120 may be implemented as a software applications running on one or more computing systems that are connected to each other and to content providers 130 in a communication network (e.g., the Internet). Content providers 130 may include web servers or other computing systems configured for delivery or storage of content.

In one implementation, crawler 110 may be configured to classify (e.g., index) content stored on content providers 130. Aggregator 120 may be configured to act as a conduit between crawler 110 and content providers 130 to service requests submitted by crawler 110 to help retrieve one or more references (e.g., uniform resource locators (URLs)) that identify content available on one or more content providers 130. The aggregator 120 may be implemented to run on one or more of content providers 130 or on other computing systems acting as proxies for servicing requests submitted by crawler 110. As provided in further detail below, in some embodiments, more than one aggregator 120 (not shown) may be employed, for example, where several content providers 130 are designated as associated with one another related content providers).

In accordance with one embodiment, crawler 110 may start a crawling session by sending a request to aggregator 120 to access content on one or more content providers 130. The request may comprise page information including, for example, a starting index and a range. As such, crawler 110 may request access to content (e.g., documents 51 to 60) of a content provider 130 by setting the starting index to a first value (e.g., 51) and the range to a second value (e.g., 10).

The request may also comprise state or timing information. In one embodiment, state information (e.g., State', State'', State''', State'''') may comprise an opaque object generated by content providers 130 for passing internal information between content providers 130. The object may be passed to aggregator 120, which may insert additional information. Crawler 110 may use state information to access content from more than one content provider 130 during a single crawling request. Table 1 below provides an exemplary implementation of state information.

TABLE 1

| | |
|---|---|
| nextSource | Identifies the next content provider for the next request. |
| nextStartIndex | The start index for the next content provider. |
| lastIndex | The last requested index. This information assists in checking if state information is valid and can be used during the request. |
| aggregated-Timestamp | Contains entries mapping content providers to the latest timing information. |
| aggregated-State | Contains entries mappings content providers to the latest state information. |

In one embodiment, timing information (e.g., Timestamp', Timestamp'', Timestamp''', Timestamp'''') may comprise an opaque timestamp object that is created by an application and may be internal to the application. In another embodiment, timing information may comprise a timestamp that is internal to a particular content provider 130. In yet another embodiment, timing information may comprise a document identification number for the last retrieved document, wherein the each update is associated with a new document identification number.

Crawler 110 may use timing information during an incremental crawling session. For example, crawler 110 may submit one or more crawling requests to access content on content providers 130. However, if crawler 110 has already crawled the content on content providers 130 during a previous crawling session, crawler 110 may limit crawling to updated content on content providers 130 by using timing information.

Figure 2:
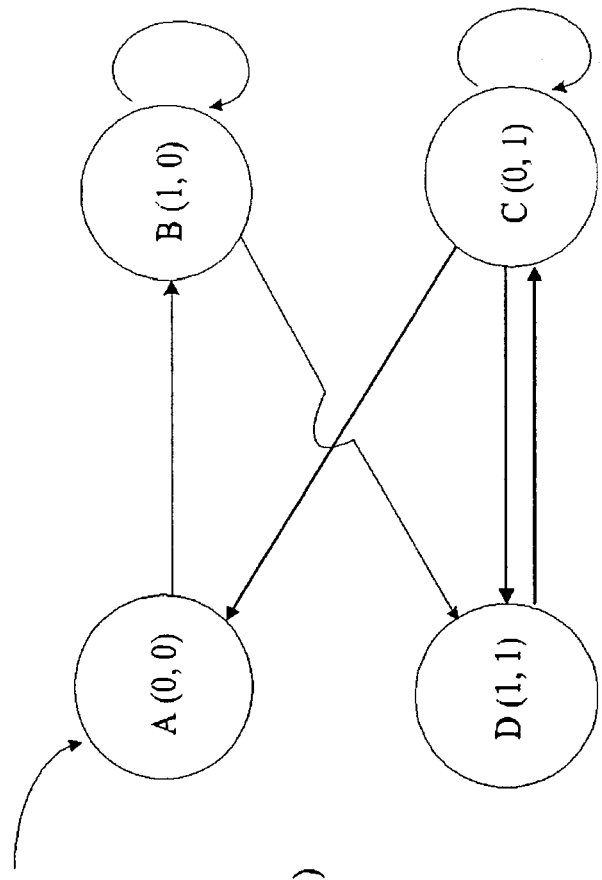
FIG. 2 is a state machine that describes state and timing information during full and incremental crawling sessions, in accordance with one embodiment.

FIG. 2, in accordance with one embodiment, provides a state machine that describes state and timing information during full and incremental crawling sessions. At point A (0, 0), crawler 110 starts a full crawling session with a first request for content. The first coordinate "0" indicates that there is no state information, and the second coordinate "0" indicates that there is no timing information. At point B (1, 0), crawler 110 submits one or more subsequent requests for content. There is state information, but no timing information because it is the first crawling session.

Crawler 110 then completes the full crawling session and updates content on content providers 130. At point C (0, 1), crawler 110 starts an incremental crawling session with a first request for content. There is no state information because it is the first request, but there is timing information from the previous full crawling session. At point D (1, 1), crawler 110 submits one or more subsequent requests for content. There is both state and timing information. Timing information, however, does not change between requests. Crawler 110 returns to point A and disregards timing information if crawler 110 starts another full crawling session.

Figure 3A:
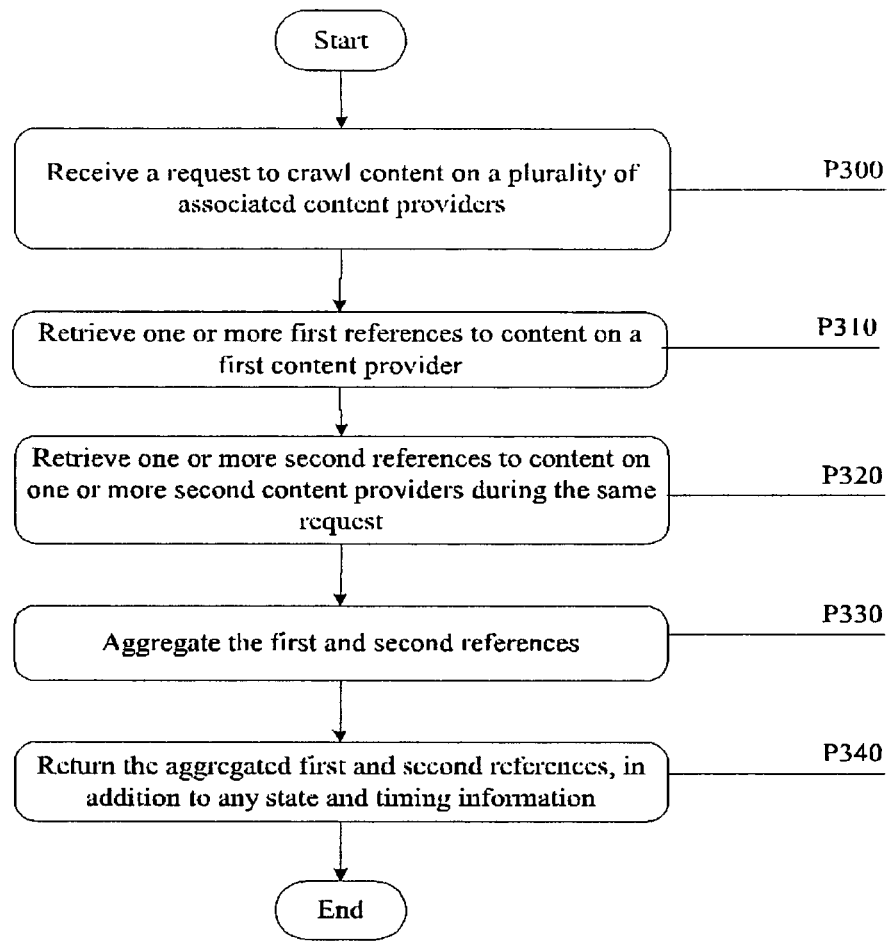
FIG. 3A is a flow diagram of a method for incremental crawling of multiple content providers using aggregation, in accordance with one embodiment.

Referring to FIGS. 1 and 3A, in accordance with one embodiment, upon receiving a request to crawl content on a plurality of associated content providers (P300), aggregator 120 may retrieve one or more first references to content on a first content provider 130 (P310) and one or more second references to content on one or more second content providers 130 during the same request (P320). Once the first and second references are retrieved, aggregator 120 may aggregate the first and second references (P330).

Accordingly, crawler 110 may access content on the first content provider 130 to index content available on the first content provider 130. As noted earlier, process P320 may be repeated for subsequent content providers 130, depending on implementation, if the crawling request is not satisfied by the first content provider 130. For example, if 50 documents are requested and the first content provider 130 has 20 documents, aggregator 120 may provide the crawler 110 with 30 additional documents that may be available on other content providers 130. If the other content providers 130 cannot fully satisfy the request, the request is satisfied to the maximum extent possible.

In response to a crawling request, aggregator 120 may return to crawler 110 one or more references to content available on the first content provider 130 and subsequent content providers 130, in addition to state information and timing information (P340). Aggregator 120 (or crawler 110) may be configured to associate the state information with the content available on content providers 130. In one embodiment, the state information is not directly associated with the content by the content providers 130. Therefore, the content remains stateless and thus several crawlers 110 may access the content concurrently without risking corruption or deadlock.

In other words, in one embodiment, the content is stored on content providers 130, desirably, independent of the state information that is tracked by aggregator 120 (or crawler 110). Since the content is read-only and stateless, from the point of view of a content provider 130, no locking mechanism may need to be implemented to prohibit a second crawler from concurrently accessing content being accessed by a first crawler. Depending on implementation, the state information may be determined based on timing information associated with a crawler's 110 access to content available on each content provider 130. In one embodiment, for example, timing information may be associated with content accessed by crawler 110 to identify a certain point in time when a request for accessing the content was submitted by crawler 110 to aggregator 120.

For example, timing information associated with content during a first crawling session may be used during a subsequent crawling session to determine if the content has been updated since the previous crawling session. If so, the updated content is crawled, and the old content is not crawled. That is, if no content has been updated, then crawling the old content will have the same result as the first crawling session. In other words, crawling the old content will effectively be a waste of time. Thus, advantageously, the timing information may be used to avoid unnecessary crawling. More detailed examples are provided below to further illustrate how the state information and timing information data may be utilized to allow for an incremental crawling process.

Figure 3B:
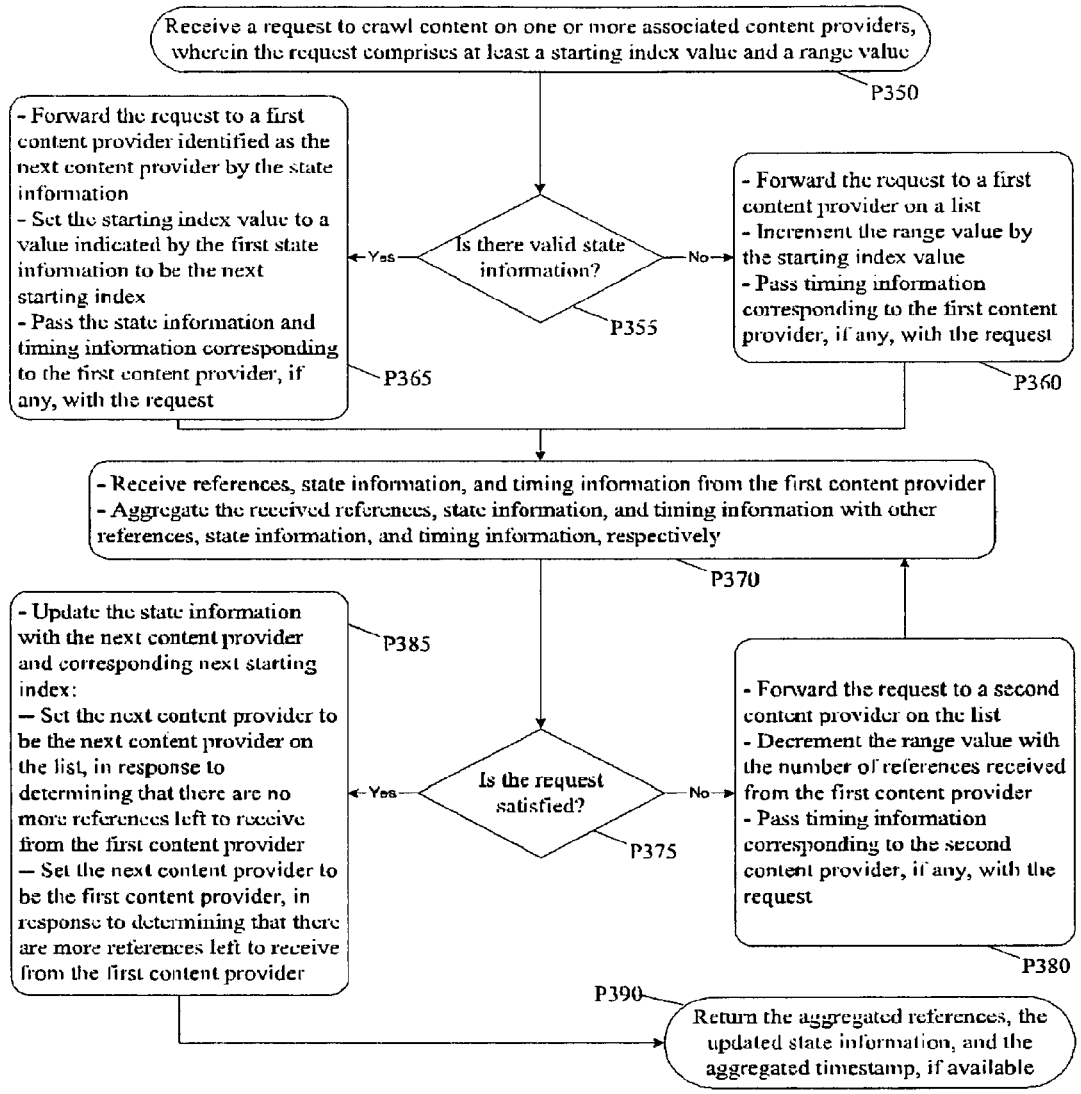
FIG. 3B is a more detailed flow diagram of a method for incremental crawling of multiple content providers using aggregation, in accordance with one embodiment.

Referring to FIGS. 1 and 3B, in accordance with one embodiment, aggregator 120 may receive a request to crawl content on a plurality of associated content providers 130, wherein the request comprises at least a starting index value and a range value (P350). The request may also comprise state information. The state information is valid if the starting index value is the same as the last requested index (e.g., lastIndex), which is stored in the state information.

If there is no valid state information (P355), aggregator 120 forwards the request to a first content provider 130 on a list of associated content providers 130, increments the range value by the starting index value, and passes timing information corresponding to the first content provider 130, if any, with the request (P360). If there is valid state information (P355), aggregator 120 forwards the request to a first content provider 130 identified by the state information as the next content provider (e.g., nextSource), sets the starting index value to a value indicated by the first state information as the next starting index (e.g., nextStartIndex), and passes the state information and timing information corresponding to the first content provider 130, if any, with the request (P365).

Upon receiving references, state information, or timing information from the first content provider, aggregator 120 aggregates the received references, state information, and timing information with other references, state information (e.g., aggregated-State), and timing information (e.g., aggregated-Timestamp), respectively (P370). If the request is not satisfied to the maximum extent possible by the first content provider 130 (P375), aggregator 120 forwards the request to a second content provider 130 on the list, decrements the range value with the number of references received from the first content provider 130, and passes timing information corresponding to the second content provider, if any, with the request (P380). Processes P370, P375, and P380 are repeated until the request is satisfied to the maximum extent possible.

If the request is satisfied to the maximum extent possible by the first content provider (P375), aggregator 120 updates the state information by setting the next content provider 130 (e.g., nextSource) and corresponding next starting index (e.g., nextStartIndex) (P385). If there are no more references left to receive from the first content provider 130, aggregator 120 sets the next content provider 130 to be the next content provider 130 on the list (P385). If there are more references left to receive from the first content provider 130, aggregator 120 sets the next content provider to be the first content provider 130 (P385).

Upon determining that the request has been satisfied to the maximum extent possible, aggregator 120 returns the aggregated references, the updated state information, and the aggregated timestamp, if available (P390). As provided earlier, a request is satisfied to the maximum extent possible if the requested number of references has been returned or if there are no more associated content providers 130.

On the other end, upon receiving timing information, a content provider 130 reads the information and returns references that have been updated since the last crawling session. Upon receiving state information, a content provider 130 uses the information for optimization purposes. Upon receiving a request with a starting index value of zero, a content provider 130, returns timing information. Upon receiving a request with a starting index value of zero, a content provider 130, does not return timing information because the request is not the first request in the current crawling session.

Figure 4A:
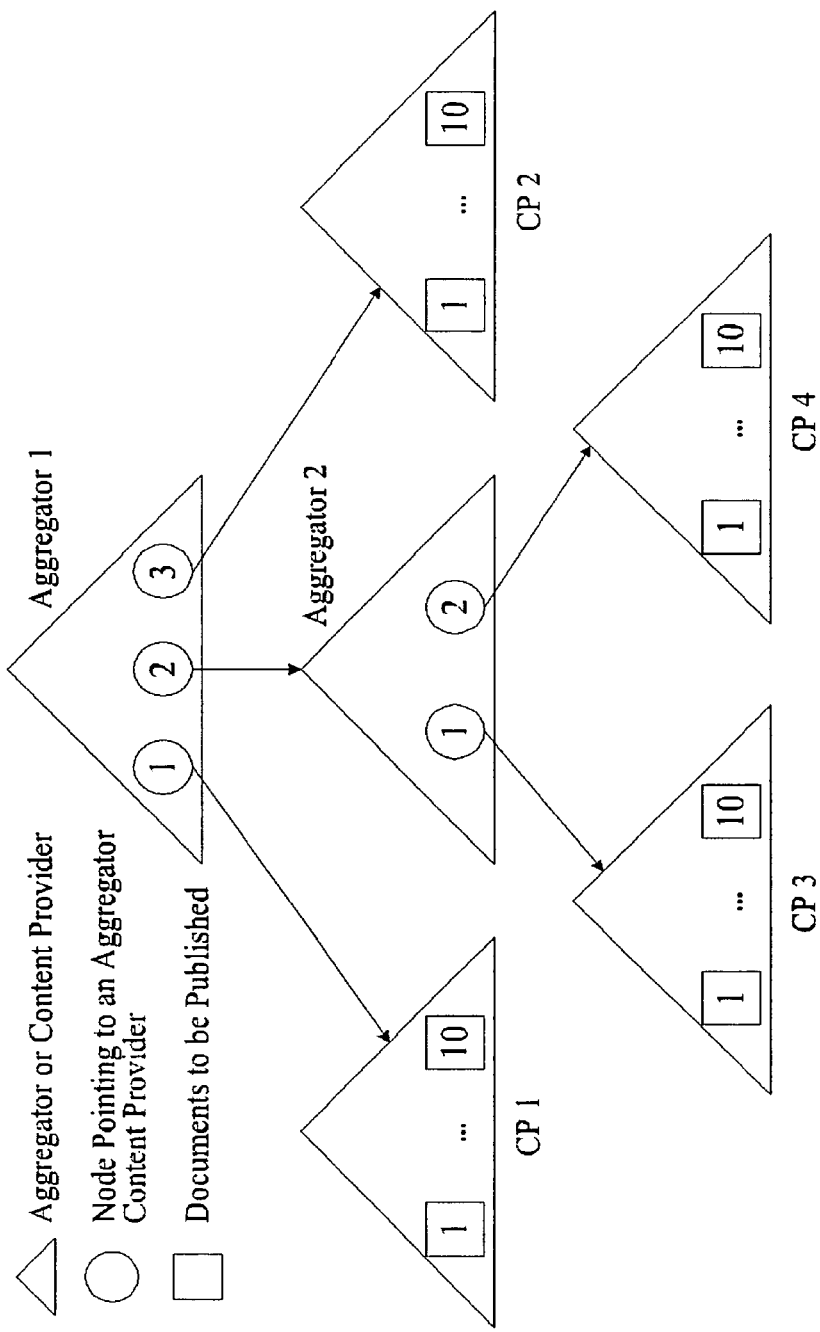
FIGS. 4A-4F illustrate incremental crawling of an exemplary system comprising multiple content providers, in accordance with one embodiment.

FIGS. 4A-4F illustrate two exemplary crawling sessions, in accordance with one or more embodiments. The first crawling session is a crawling session that, for example, started at Jan. 1, 2008 8:00. As shown in FIG. 4A, in accordance with one embodiment, Aggregator 1 is directly associated with Content Provider (CP) 1, Aggregator 2, and CP 2. Through Aggregator 2, Aggregator 1 is also associated with content providers CP 3 and CP 4. In this example, each content provider has 10 documents, thus the first exemplary crawling session involves 3 sub-requests.

Figure 4B:
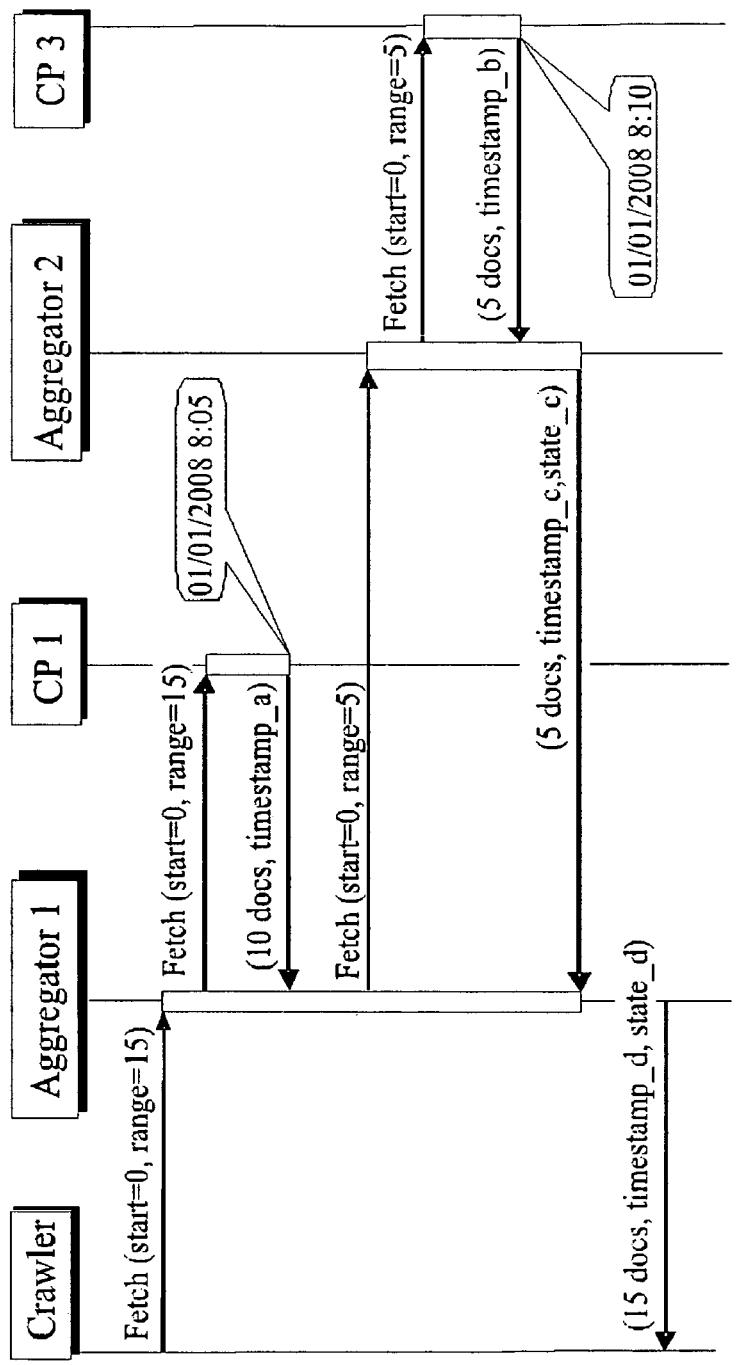

Referring to FIG. 4B, in accordance with one embodiment, Crawler sends a request to access 15 content pages (e.g., documents) to Aggregator 1. The range value is incremented by a starting index of 0, so that the range value is 15. There is no state information because the crawling session has just begun, and there is no timestamp because there have been no previous crawling sessions. Aggregator 1 forwards the request to CP 1, and CP 1 returns a list of references to 10 documents on CP 1, and a timestamp (e.g., timestamp_a). Once Aggregator 1 receives the list and the timestamp, Aggregator 1 updates its state information as provided in the example pseudo-code (I).

```
                        (I)
                  Aggregator 1:

state {
        aggregated-timestamp {
            CP_1 → timestamp_a = 01/01/2008 8:05;
        }
    }
```

Upon updating its state information, Aggregator 1 decrements the range value by 10 and forwards the request to Aggregator 2. Aggregator 2, in turn, forwards the request to CP 3. CP 3 returns a list of 5 documents and a timestamp (e.g., timestamp_b), and Aggregator 2 updates its state information as provided in the example pseudo-code (II).

```
                        (II)
                  Aggregator 2:

state {
        nextSource = CP_3;
        nextStartIndex = 5;
        aggregated-timestamp {
            CP_3 → timestamp_b = 01/01/2008 8:10;
        }
    }
```

Upon updating its state information, Aggregator 2 returns the list of 5 documents, along with state information (e.g., state_c) and a timestamp (e.g., timestamp_c). Once Aggregator 1 receives the list, state information, and timestamp, Aggregator 1 returns a list of 15 documents (i.e., 10 from CP 1 and 5 from Aggregator 2), along with state information (e.g., state_d) and a timestamp (e.g., timestamp_d), to the crawler. Aggregator 1 also updates its state information as in the example pseudo-code (III):

```
                              (III)
                          Aggregator 1:

state {
         nextSource = Aggregator_2;
         nextStartIndex = 5;
         aggregated-state {
             Aggregator_2 → state_c;
         }
         aggregated-timestamp {
             CP_1 → timestamp_a = 01/01/2008 8:05;
             Aggregator_2 → timestamp_c;
         }
     }
```

Figure 4C:
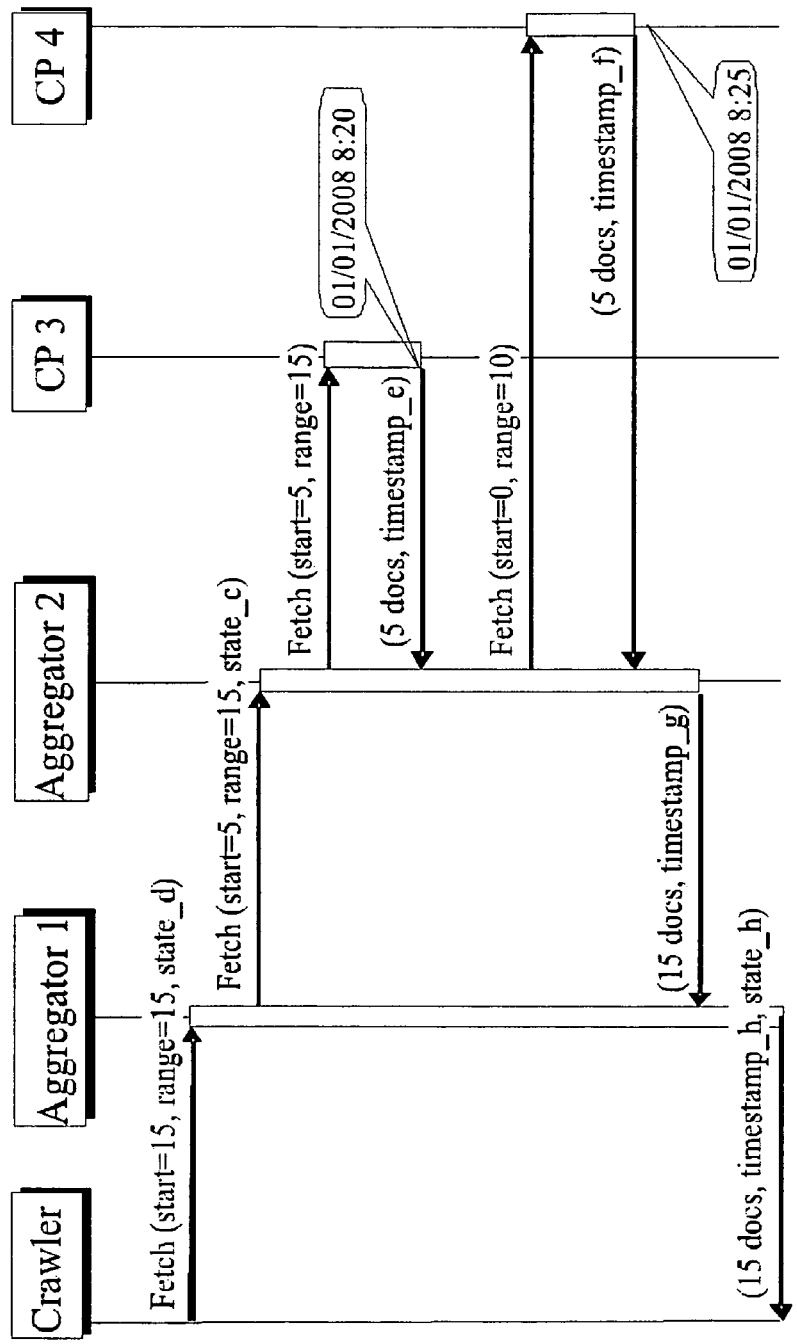

Referring to FIG. 4C, in accordance with one embodiment, Crawler sends a request to Aggregator 1 to access the next 15 documents, along with state information (e.g., state_d) from the previous request. There is no timestamp because the request belongs to the same crawling session. Upon receiving the request and state information, Aggregator 1 reads the received state information, sets the request's starting index to 5 and range value to 15, and forwards the request to Aggregator 2. Aggregator 2, in turn, reads its state information and forwards the request to CP 3. Upon receiving the request and state information, CP 3 returns a list of the remaining 5 documents. CP 3 does not return a timestamp because the starting index is not 0 (i.e., the request is not the first request for this crawling session).

Upon receiving the list of 5 documents, Aggregator 2 forwards the request to CP 4, since the request has not been satisfied. CP 4 returns a list of 10 documents and a timestamp (e.g., timestamp_f) and indicates that there are no more documents to be accessed on CP 4. Once Aggregator 2 receives the list of 10 documents, Aggregator 2 returns a list of 15 documents (i.e., 5 from CP 3 and 10 from CP 4) and a timestamp (timestamp_g) and indicates that there are no more documents to be accessed on Aggregator 2. Aggregator 2 also updates its state information as provided in the example pseudo-code (IV).

```
                              (IV)
                          Aggregator 2:

aggregated-timestamp {
         CP_3 → timestamp_b = 01/01/2008 8:10;
         CP_4 → timestamp_f = 01/01/2008 8:25;
     }
```

Upon receiving the list of 15 documents from Aggregator 2, Aggregator 1 returns the list of 15 documents, along with state information (e.g., state_h) and a timestamp (e.g., timestamp_h) to Crawler. Aggregator 1 also updates its state information as provided in the example pseudo-code (V).

```
                              (V)
                          Aggregator 1:

state {
         nextSource = CP_2;
         nextStartIndex = 0;
         aggregated-timestamp {
             CP_1 → timestamp_a = 01/01/2008 8:05;
             Aggregator_2 → timestamp_g;
         }
     }
```

Figure 4D:
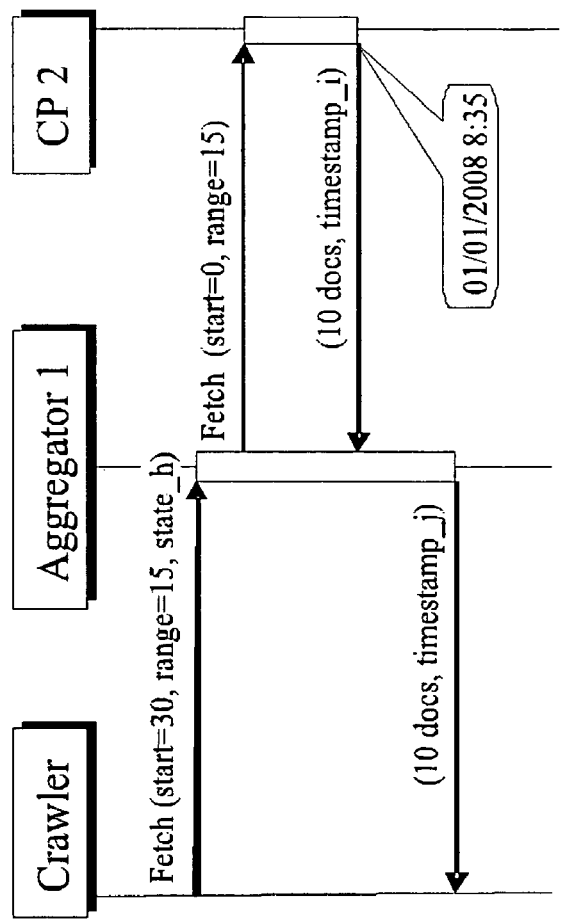
Figure 4E:
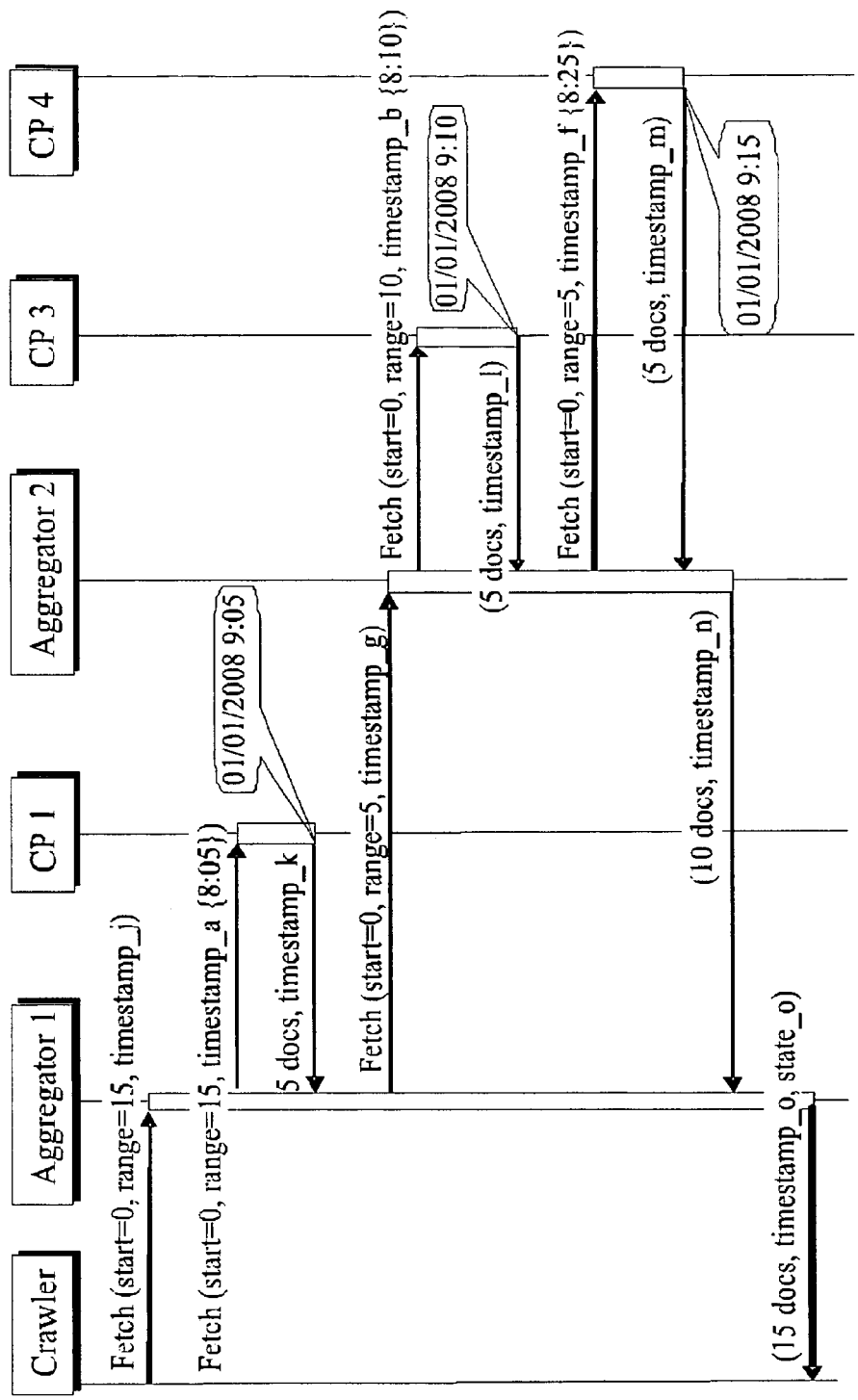

Referring to FIG. 4D, in accordance with one embodiment, Crawler sends a request to Aggregator 1 to access the next 15 documents, along with state information (e.g., state_h) from the previous request. There is no timestamp because the request belongs to the same crawling session in this scenario. Upon receiving the request and state information, Aggregator 1 reads the received state information, sets the request's starting index to 0 and range value to 15, and forwards the request to CP 2. CP 2, in turn, returns a list of 10 documents and a timestamp (e.g., timestamp_i) and indicates that there are no more documents to be accessed on CP 2. Once Aggregator 1 receives the list of 10 documents, Aggregator 1 returns the list of 10 documents and a timestamp (timestamp_j). Aggregator 1 also updates its state information, as provided in the example pseudo-code (VI).

```
                              (VI)
                          Aggregator 1:

aggregated-timestamp {
         CP_1 → timestamp_a = 01/01/2008 8:05;
         Aggregator_2 → timestamp_g;
         CP_2 → timestamp_i = 01/01/2008 8:35;
     }
```

The second crawling session is an incremental crawling session that starts at Jan. 1, 2008 9:00, for example. In the second crawling session, the Crawler accesses the updates that occurred between the first crawling session and the start of the second crawling session (e.g., current time). The second crawling session is built from 2 sub-requests, this scenario. As shown, in FIG. 4E, in accordance with one embodiment, Crawler sends a request to Aggregator 1 to access 15 updated documents, along with the latest timestamp from the first crawling session (e.g., timestamp_j). The range value is incremented by a starting index of 0, so that the range value is 15. There is no state information because the crawling session has just begun.

Aggregator 1 forwards the request to CP 1, along with the relevant timestamp for CP 1 (e.g., timestamp_a). Upon receiving the request and timestamp, CP 1 reads the timestamps and returns a list of 5 documents that were updated after Jan. 1, 2008 8:05 and a timestamp (e.g., timestamp_k). Once Aggregator 1 receives the list and timestamp, Aggregator 1 updates its state information as provided in the exemplary pseudo-code (VII).

```
                              (VII)
                          Aggregator 1:

state {
         aggregated-timestamp {
             CP_1 → timestamp_k = 01/01/2008 9:05;
         }
     }
```

Upon updating its state information, Aggregator 1 decrements the range value by 5 and forwards the request to Aggregator 2, along with the relevant timestamp for Aggregator 2 (e.g., timestamp_g). Aggregator 2, in turn, forwards the request to CP 3, along with the relevant timestamp for CP 3 (e.g., timestamp_b). CP 3 returns a list of 5 documents that were updated after Jan. 1, 2008 8:10 and a timestamp (e.g., timestamp_l).

Since the request is not satisfied, Aggregator 2 then forwards the request to CP 4, along with the relevant timestamp for CP 4 (e.g., timestamp_f). CP 4 returns a list of 5 documents that were updated after Jan. 1, 2008 8:25 and a timestamp (e.g., timestamp_m) and indicates that there are no more documents to be accessed on CP 4. Once Aggregator 2 receives the list and timestamp, Aggregator 2 updates its state information, as provided in the example pseudo-code (IIX).

(IIX)
Aggregator 2:

```
aggregated-timestamp {
    CP_3 → timestamp_l = 01/01/2008 9:10;
    CP_4 → timestamp_m = 01/01/2008 9:15;
}
```

Upon updating its state information, Aggregator 2 returns a list of 10 documents (i.e., 5 from CP 3 and 5 from CP 4), along with state information (e.g., state_n) and a timestamp (e.g., timestamp_n). Once Aggregator 1 receives the list, state information, and timestamp, Aggregator 1 returns a list of 15 documents (i.e., 5 from CP 1 and 10 from Aggregator 2), along with state information (e.g., state_o) and a timestamp (e.g., timestamp_o), to Crawler. Aggregator 1 also updates its state information, as provided in the example pseudo-code (IX):

(IX)
Aggregator 1:

```
state {
    nextSource = CP_2;
    nextStartIndex = 0;
    aggregated-timestamp {
        CP_1 → timestamp_k = 01/01/2008 9:05;
        Aggregator_2 → timestamp_n;
    }
}
```

Figure 4F:
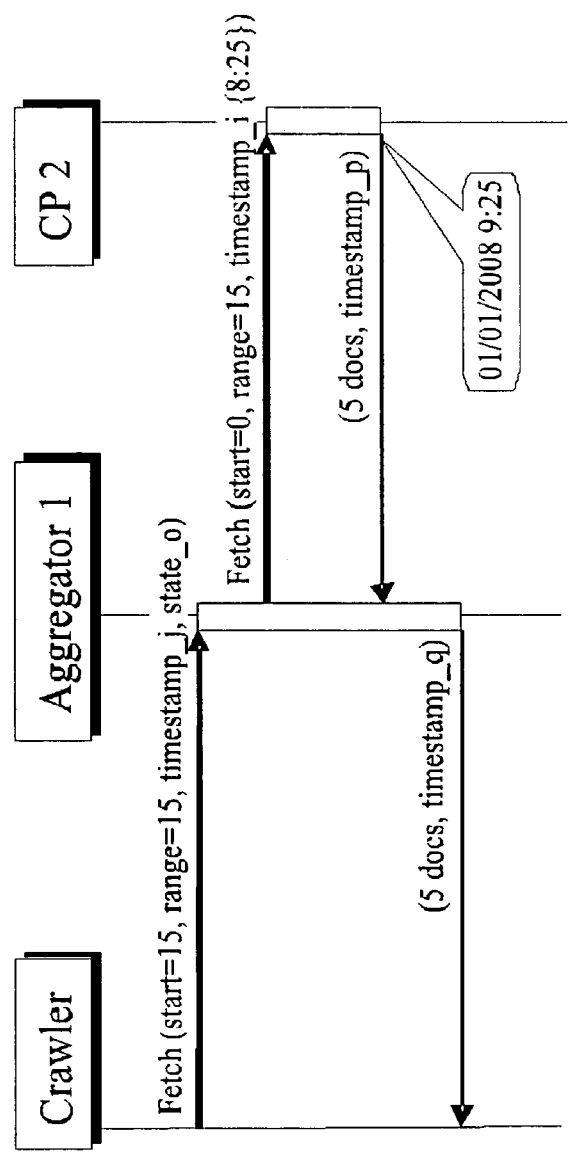

Referring to FIG. 4F, in accordance with one embodiment, Crawler sends a request to Aggregator 1 to access the next 15 updated documents, along with state information (e.g., state_o) from the previous request and the latest timestamp from the first crawling session (e.g., timestamp_j).

Upon receiving the request and state information, Aggregator 1 reads the received state information, sets the request's starting index to 0 and range value to 15, and forwards the request to CP 2, along with the relevant timestamp for CP 2 (e.g., timestamp_i). CP 2, in turn, returns a list of 5 documents that were updated after Jan. 1, 2008 8:25 and a timestamp (e.g., timestamp_p) and indicates that there are no more documents to be accessed on CP 2. Once Aggregator 1 receives the list and timestamp, Aggregator 1 returns the list of 5 documents and a timestamp (e.g., timestamp_q) to Crawler. Aggregator 1 also updates its state information, as provided in example pseudo-code (X).

(X)
Aggregator 1:

```
aggregated-timestamp {
    CP_1 → timestamp_k = 01/01/2008 9:05;
    Aggregator_2 → timestamp_n;
    CP_2 → timestamp_p = 01/01/2008 9:25;
}
```

In different embodiments, the invention may be implemented either entirely in the form of hardware or entirely in the form of software, or a combination of both hardware and software elements. For example, crawler 110, aggregator 120, and content providers 130 may comprise a controlled computing system environment that may be presented largely in terms of hardware components and software code executed to perform processes that achieve the results contemplated by the system of the present invention.

Advantageously, the present invention facilitates efficient incremental crawling. The systems and methods provided above do not require time zone synchronization and allow aggregators to save state information to optimize indexing or searching of content on multiple content providers. Also, the transparent management of content providers allows for efficient handling of long, failed, or intentionally interrupted crawling sessions.

Figure 5:
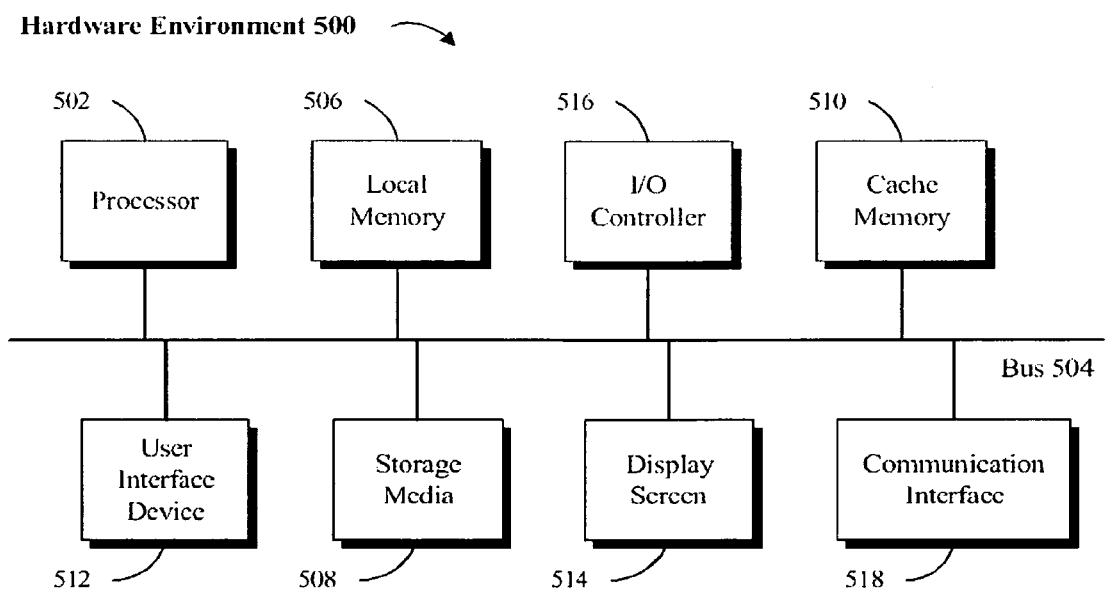
FIGS. 5 and 6 are block diagrams of hardware and software environments in which a system of the present invention may operate, in accordance with one or more embodiments.
Figure 6:
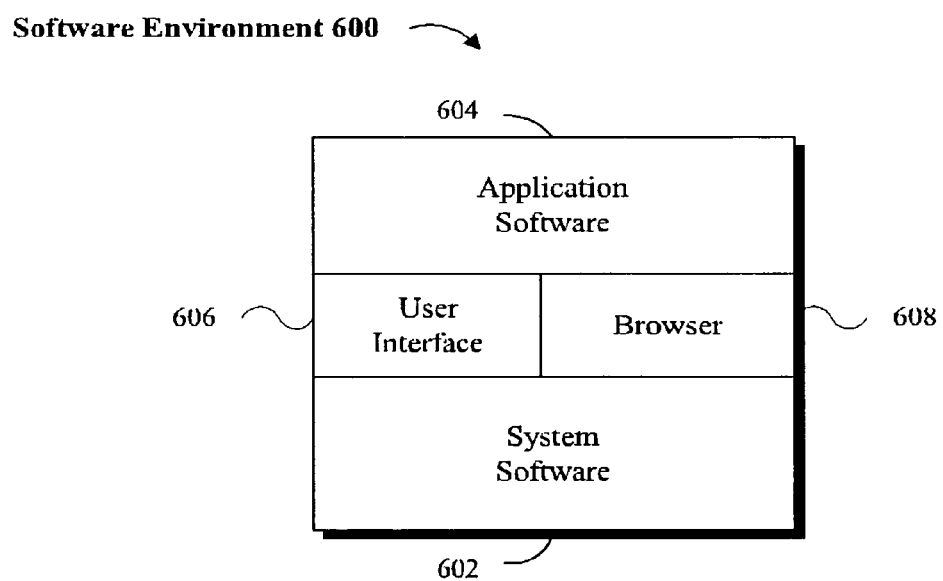

Referring to FIGS. 5 and 6, a computing system environment in accordance with an exemplary embodiment is composed of a hardware environment 500 and a software environment 600. The hardware environment 500 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 600 is divided into two major classes comprising system software 602 and application software 604. System software 602 comprises control programs, such as the operating system (OS) and information management systems that instruct the hardware how to function and process information.

In one embodiment, crawler 110 and aggregator 120 may be implemented as system software 602 or application software 604 executed on one or more hardware environments to facilitate incremental crawling of multiple content providers using aggregation. Application software 604 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 5, an embodiment of the system software 602 and application software 604 may be implemented as computer software in the form of computer readable code executed on a data processing system such as hardware environment 500 that comprises a processor 502 coupled to one or more computer readable media or memory elements by way of a system bus 504. The computer readable media or the memory elements, for example, may comprise local memory 506, storage media 508, and cache memory 510. Processor 502 loads executable code from storage media 508 to local memory 506. Cache memory 510 provides temporary storage to reduce the number of times code is loaded from storage media 508 for execution.

A user interface device 512 (e.g., keyboard, pointing device, etc.) and a display screen 514 can be coupled to the computing system either directly or through an intervening I/O controller 516, for example. A communication interface unit 518, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 500 may not include all the above components, or may comprise other components for additional functionality or utility. For example, hardware environment 500 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 518 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, system software 602 and application software 604 may comprise one or more computer programs that are executed on top of an operating system after being loaded from storage media 508 into local memory 506. In a client-server architecture, application software 604 may comprise client software and server software. For example, in one embodiment of the invention, client software is executed on one or more computing systems (not shown) and server software is executed on a server system (not shown).

Software environment 600 may also comprise browser software 608 for accessing data available over local or remote computing networks. Further, software environment 600 may comprise a user interface 606 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for incremental crawling of content stored on a plurality of content providers using aggregation comprising:
   receiving a plurality of requests from a document crawler at an aggregator to crawl content on a plurality of associated content providers within the same crawling session, each request to crawl comprising an amount of documents to be incrementally retrieved from the associated content providers for that request and providing a portion of the total documents produced by the crawling session, wherein a plurality of crawlers access the content concurrently;
   processing each request by:
      retrieving one or more first references to content on a first content provider;
      in response to a quantity of references from the first content provider being insufficient to satisfy the amount of documents, generating state and timing information at the aggregator and retrieving one or more second references to content on one or more second content providers during the same request based on the state information, wherein the state information indicates a quantity of remaining documents to retrieve for the request, and wherein the timing information does not change between requests of the same crawling session and is disregarded when the document crawler enters a full crawling session;
      aggregating the first and second references at the aggregator and updating the state information to capture a state of the crawling session for subsequent requests, wherein the updated state information indicates a next content provider to access and a starting reference index within the next content provider to indicate a next document in the next content provider from which to initiate retrieval of references for a subsequent request to retrieve a subsequent portion of documents in the same crawling session; and
      returning the aggregated first and second references from the aggregator to the document crawler.

2. The method of claim 1, further comprising returning at least a portion of the state information, wherein the state information allows passing of internal information between the associated content providers.

3. The method of claim 2, wherein the associated content providers do not save the state information, allowing several crawlers to request access to the plurality of content providers.

4. The method of claim 1, wherein the second references are returned such that a corresponding request is satisfied, in response to determining that content on the first content provider is less than the amount of documents.

5. The method of claim 1, wherein the aggregated first and second references are returned in response to determining that a corresponding request cannot be fully satisfied by content on the associated content providers.

6. The method of claim 1, wherein the retrieving comprises indexing all content on the associated content providers for future retrieval.

7. The method of claim 1, wherein the retrieving comprises incremental indexing of updated content on the associated content providers for future retrieval.

8. The method of claim 7, further comprising returning a timestamp, wherein the timestamp identifies when a corresponding request was submitted.

9. The method of claim 8, wherein the timestamp is used during a subsequent incremental crawling session to access content on the associated content providers updated after the identified time.

10. A system for incremental crawling of content stored on a plurality of content providers using aggregation comprising:
at least one processor configured to:
receive a plurality of requests from a document crawler to crawl content on a plurality of associated content providers within the same crawling session, each request to crawl comprising an amount of documents to be incrementally retrieved from the associated content providers for that request and providing a portion of the total documents produced by the crawling session, wherein a plurality of crawlers access the content concurrently;
process each request by:
retrieving one or more first references to content on a first content provider;
in response to a quantity of references from the first content provider being insufficient to satisfy the amount of documents, generating state and timing information and retrieving one or more second references to content on one or more second content providers during the same request based on the state information, wherein the state information indicates a quantity of remaining documents to retrieve for the request, and wherein the timing information does not change between requests of the same crawling session and is disregarded when the document crawler enters a full crawling session;
aggregating the first and second references and updating the state information to capture a state of the crawling session for subsequent requests, wherein the updated state information indicates a next content provider to access and a starting reference index within the next content provider to indicate a next document in the next content provider from which to initiate retrieval of references for a subsequent request to retrieve a subsequent portion of documents in the same crawling session; and
returning the aggregated first and second references to the document crawler.

11. The system of claim 10, wherein the at least one processor is further configured to:
return at least a portion of the state information, wherein the state information allows passing of internal information between the associated content providers, and wherein the associated content providers do not save the state information, thereby allowing several crawlers to request access to the plurality of content providers.

12. The system of claim 10, wherein the aggregated first and second references are returned in response to determining that a corresponding request cannot be fully satisfied by content on the associated content providers.

13. The system of claim 10, wherein the retrieving comprises indexing all content on the associated content providers for future retrieval.

14. The system of claim 10, wherein the retrieving comprises incremental indexing of updated content on the associated content providers for future retrieval.

15. The system of claim 14, wherein the at least one processor is further configured to:
return a timestamp, wherein the timestamp identifies when a corresponding request was submitted, and wherein the timestamp is used during a subsequent incremental crawling session to access content on the associated content providers updated after the identified time.

16. A computer program product for incremental crawling of content stored on a plurality of content providers using aggregation comprising:
a non-transitory computer readable medium having computer readable program code embodied therewith, the computer readable program code comprising computer readable program code configured to:
receive a plurality of requests from a document crawler to crawl content on a plurality of associated content providers within the same crawling session, each request to crawl comprising an amount of documents to be incrementally retrieved from the associated content providers for that request and providing a portion of the total documents produced by the crawling session, wherein a plurality of crawlers access the content concurrently;
process each request by:
retrieving one or more first references to content on a first content provider;
in response to a quantity of references from the first content provider being insufficient to satisfy the amount of documents, generating state and timing information and retrieving one or more second references to content on one or more second content providers during the same request based on the state information, wherein the state information indicates a quantity of remaining documents to retrieve for the request, and wherein the timing information does not change between requests of the same crawling session and is disregarded when the document crawler enters a full crawling session;
aggregating the first and second references and updating the state information to capture a state of the crawling session for subsequent requests, wherein the updated state information indicates a next content provider to access and a starting reference index within the next content provider to indicate a next document in the next content provider from which to initiate retrieval of references for a subsequent request to retrieve a subsequent portion of documents in the same crawling session; and returning the aggregated first and second references to the document crawler.

17. The computer program product of claim 16, wherein the computer readable program code further comprises computer readable program code configured to:

return at least a portion of the state information, wherein the state information allows passing of internal information between the associated content providers, and wherein the associated content providers do not save the state information, thereby allowing several crawlers to request access to the plurality of content providers.

18. The computer program product of claim 16, wherein the aggregated first and second references are returned in response to determining that a corresponding request cannot be fully satisfied by content on the associated content providers.

19. The computer program product of claim 16, wherein the retrieving comprises incremental indexing of updated content on the associated content providers for future retrieval.

20. The computer program product of claim 19, wherein the computer readable program code further comprises computer readable program code configured to:

return a timestamp, wherein the timestamp identifies when a corresponding request was submitted, and wherein the timestamp is used during a subsequent incremental crawling session to access content on the associated content providers updated after the identified time.

\* \* \* \* \*